United States Patent Office 3,531,251
Patented Sept. 29, 1970

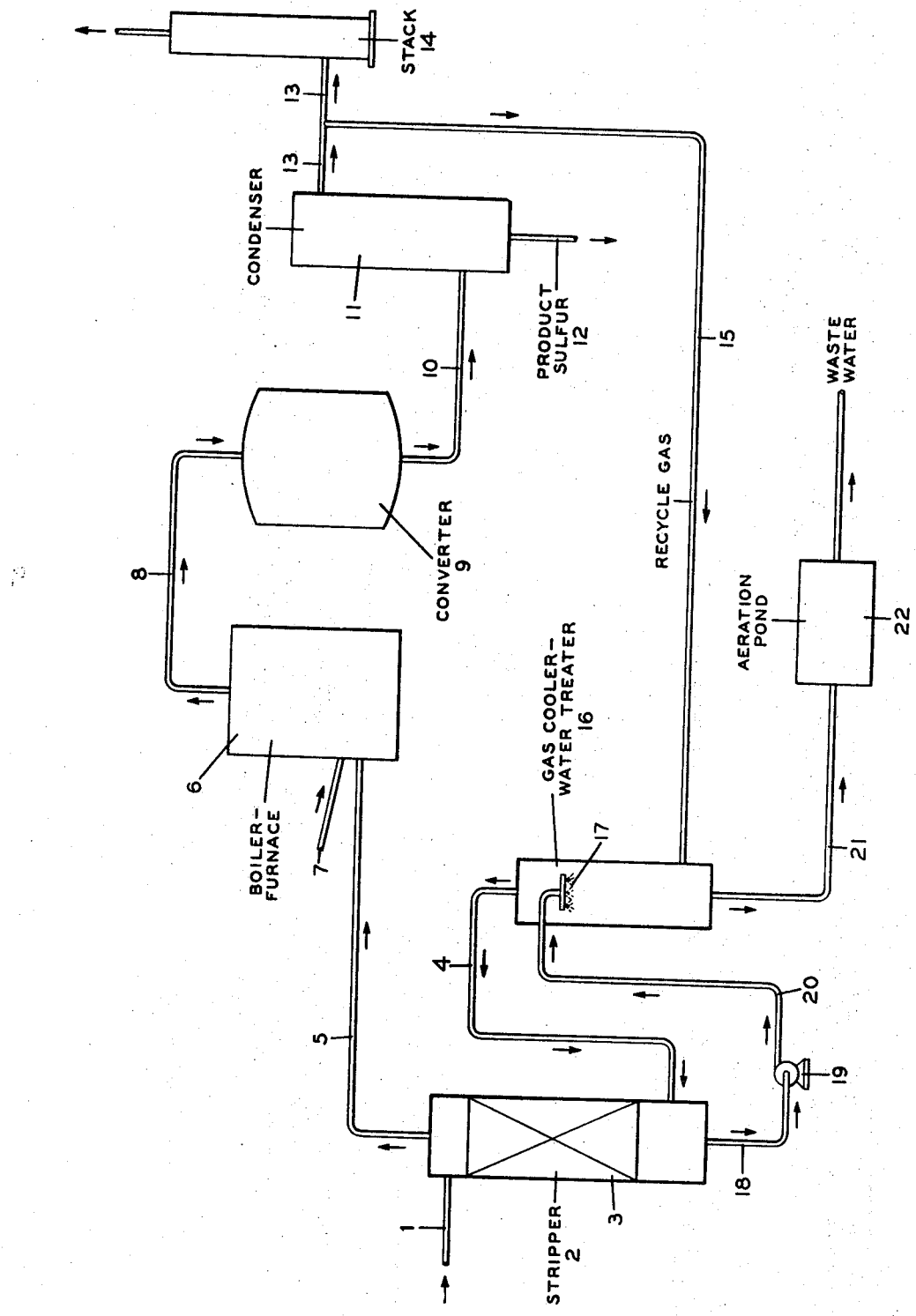

3,531,251
RECOVERING ELEMENTAL SULFUR FROM
WATERS CONTAINING HYDROGEN SULFIDE
Vas Hubert Brogdon, Greenwich, Conn., assignor to
Freeport Sulphur Company, New York, N.Y., a corporation of Delaware
Continuation-in-part of application Ser. No. 652,853,
July 12, 1967. This application Mar. 11, 1969, Ser.
No. 806,128
Int. Cl. C01b *17/06*
U.S. Cl. 23—225                                    11 Claims

ABSTRACT OF THE DISCLOSURE

Water, containing hydrogen sulfide, is stripped of hydrogen sulfide with nitrogen gas, without the introduction of external heat, a portion, about one-third, of the hydrogen sulfide removed from the water is oxidized to sulfur dioxide and the resulting sulfur dioxide reacted with the remainder of the hydrogen sulfide to produce elemental sulfur. The elemental sulfur is cooled, collected and removed from the system. The remaining uncondensed inert gases, consisting primarily of nitrogen, are recycled to strip hydrogen sulfide from additional amounts of water containing it.

---

This application is a continuation-in-part of my copending application, Ser. No. 652,853, filed July 12, 1967, now abandoned.

The present invention relates to a process for removing hydrogen sulfide from water. More particularly, the invention is concerned with a novel integrated process for treating water, having a high content of hydrogen sulfide, to remove the hydrogen sulfide and recover the sulfur values in the form of elemental sulfur.

Natural well waters and waters from other sources frequently have a high content of hydrogen sulfide. It is generally not desirable to discharge such waters to waste in natural bodies of water, or even man-made ponds, because the hydrogen sulfide is both toxic and volatile. The hydrogen sulfide escapes into the air causing air pollution and an obnoxious odor in the surrounding atmosphere. When discharged into natural bodies of water the hydrogen sulfide can poison valuable fish and by contaminating the water make it unpalatable for human consumption.

So far as is known, no commercial process has ever been developed which will recover the hydrogen sulfide from waters containing it and convert the sulfur values to elemental sulfur. Yet, waters high in hydrogen sulfide content are potentially valuable because of the sulfur content and if an economical method of recovering the hydrogen sulfide from the water and converting it to elemental sulfur could be found, a source of nuisance could be converted into a source of value.

Up to the present, the art has been concerned almost solely with the treatment of waters containing large amounts of hydrogen sulfide to make the water safe for disposal. This has involved treatment of the water or the hydrogen sulfide so that it could be disposed of without causing injury to aquatic life or create a public nuisance. In some cases, the prior art methods have involved converting the toxic hydrogen sulfide into some less objectionable compound which can then be released into natural waters or sewers. But no effort has been made to capitalize on the presence of the hydrogen sulfide and convert it to a usable form. These prior art methods have served only to increase the cost of disposing of the hydrogen sulfide in the water without obtaining any commercial compensation for the cost of the treatment.

In spite of the absence of activity to recover the hydrogen sulfide present in waters and convert it into elemental sulfur, there are known methods for transforming hydrogen sulfide, in gaseous form, into elemental sulfur. One prominent process for this purpose is the Claus process, in which about one-third of the hydrogen sulfide is burned with air to form sulfur dioxide, and the resulting mixture of hydrogen sulfide, sulfur dioxide, water vapor and the nitrogen which remains after the oxygen in the air has been utilized to oxidize the hydrogen sulfide to sulfur dioxide, is then passed through a catalyst bed at elevated temperature. In the catalyst bed the hydrogen sulfide and sulfur dioxide react with one another to form elemental sulfur vapor and water vapor. Upon cooling of the reaction gases, the sulfur vapor condenses to liquid sulfur and is easily recovered as a valuable product, while the water vapor, nitrogen, and any small amounts of unreacted gases are discharged to the atmosphere as waste without causing significant pollution problems.

Extraction of the hydrogen sulfide from the water, prior to processing the former in the Claus process, can be dealt with in various ways. It is generally necessary to allow the water to trickle downward through packing in a packed tower while a current of inert gas or vapor passes upward in contact with it. The inert gas or vapor volatilizes the hydrogen sulfide so that it is removed from the water and recovered mixed with the inert gas. The use of gas which contains oxygen, such as ordinary air, is objectionable for removing the hydrogen sulfide from the water because the oxygen reacts with hydrogen sulfide, causing some loss of the latter as well as causing plugging of the tower packing with the elemental sulfur which deposits in the packing as a result of oxidation of the hydrogen sulfide. Steam is frequently used as the vapor to sweep the tower and, in this case, the steam condenses into the water so that the effluent gas is nearly pure hydrogen sulfide. Instead of a sweeping gas the tower may be subjected to a vacuum, causing the hydrogen sulfide to volatilize to the lower overlying pressure.

The use of inert gases is expensive because inert gases have heretofore been inherently expensive to produce. The use of steam is expensive because of the large amount of heat required to produce it, which heat cannot be recovered. The use of a vacuum is expensive because of the high pressure differential against which the vacuum pump must operate, and because of the necessity of constructing the vacuum pump of materials that are resistant to the corrosive action of wet hydrogen sulfide. Furthermore, the water leaving the packed tower in any of these methods always contains enough residual hydrogen sulfide to require further treatment before it can be discharged to waste.

It is an object of the invention to provide a method for removing hydrogen sulfide from water containing it that is more economical than the processes of the prior art.

It is also an object of the invention to remove hydrogen sulfide sufficiently from water so that the treated water can be discharged directly to natural water and pools.

It is a further object of the invention to provide a process for recovering the sulfur values in the form of elemental sulfur from water containing hydrogen sulfide.

Other objects of the invention will be apparent to those skilled in the art from the description which follows, taken in conjunction with the appended drawing, which is a diagrammatic illustration or flow diagram of the process of the invention.

In accordance with the present invention there is provided a completely integrated process for removing hydrogen sulfide from waters containing it, and particularly from waters having a high hydrogen sulfide content, and to recover the sulfur values in the form of elemental sulfur, which is commerically valuable. After the treatment, the remaining waste products and water can be discharged into natural waters or sewers without untoward results. The process of the invention is particularly important since it permits employment of the heat evolved in the conversion of the hydrogen sulfide to supply part of or all of the fuel requirements necessary for conducting the process. Partially for this reason, the process of the present invention is both commercially important and economical.

The process of the invention will be described in conjunction with the appended drawing. Water, containing substantial amounts of hydrogen sulfide, such as at least about 500 parts per million, and preferably as high as 6000 p.p.m. or more, is introduced through pipe 1 into a packed tower or stripper 2. In stripper 2, which is a conventional piece of equipment, the water containing the hydrogen sulfide flows by gravity through the packed chamber 3 while being subjected to a countercurrent upward flow of a stream of inert oxygen-free gas, consisting essentially of nitrogen, introduced into the lower portion of stripper 2 through pipe 4. The preparation of the inert gas will be apparent from the description hereinbelow. The inert gas which is passed upward through the water containing the hydrogen sulfide is not heated, i.e., it is at or slightly above the temperature of the water leaving stripper 2. The temperature of the water containing the hydrogen sulfide is that of the original body of water and no heat need be added. Thus not only is it not necessary to heat the inert gas or the water, as is done in prior art processes, but there is a saving in the cost of heating which would otherwise be required.

The inert gas stream, which now also contains the major portion of the hydrogen sulfide content of the original water is removed from the top of stripper 2 through pipe 5 and conducted into boiler-furnace 6. Boiler-furnace 6 is a standard piece of equipment customarily used in the Claus process. The gases entering through pipe 5 are introduced into the furnace section where they are mixed with a regulated amount of ordinary air introduced through pipe 7 and burned to furnish enough sulfur dioxide to react substantially stoichiometrically with the remainder of the hydrogen sulfide to form elemental sulfur and leave a slight excess of about 1 mol percent of sulfur dioxide. Desirably, the heat from this combustion of about one-third of the hydrogen sulfide is used to generate steam in the boiler component of the boiler-furnace 6.

The mixture of combustion products from the boiler-furnace 6, which mixture consists of nitrogen, hydrogen sulfide, water vapor and sulfur dioxide, is passed through pipe 8 to converter 9. Converter 9 is conventional equipment in the Claus process and it contains a hot fixed bed of bauxite or other catalyst, such as activated alumina, which causes the hydrogen sulfide and sulfur dioxide to react with one another to form elemental sulfur vapor and water vapor admixed with the nitrogen in the gas stream. This reaction proceeds in its simplest form in accordance with the following equation:

$$2H_2S + SO_2 \rightarrow 3S + 2H_2O$$

The air fed to the boiler-furnace 6 is controlled to such an amount that the gases issuing from converter 9 through pipe 10 contain a small amount of unreacted sulfur dioxide, such as between about 1 and 1.5 mol percent of the reaction product gases.

The gases removed through pipe 10 are introduced near the bottom of condenser 11, which is a conventional piece of apparatus equipped with cooling coils, or as a low pressure steam boiler whereby the gases entering near the bottom of the condenser through pipe 10 are cooled to a temperature of about 300 to 400° F. so that the sulfur vapor condenses as liquid sulfur and flows from the bottom of the condenser through pipe 12. The uncondensed gases, consisting of nitrogen, water vapor and a small amount of sulfur dioxide, pass from the top of the condenser 11 through pipe 13 to stack 14 from which the gases are discharged into the amtosphere as waste.

A portion of the non-condensible gases leaving condenser 11 through pipe 13 is recycled by pipe 15 to a combined gas cooler-water treater 16 instead of being discharged from the system through stack 14. The gas cooler-water treater 16 is a chamber equipped with a spray 17 through which the treated water leaving stripper 2 through pipe 18 by means of pump 19 and finally through pipe 20 is discharged in the upper portion of the gas cooler-water treater 16. The gases from pipe 15 entering the lower portion of gas cooler-water treater 16 flow upward and countercurrent to the downward-flowing water.

In the gas cooler-water treater 16, the small amount of sulfur dioxide in the gas reacts with the very small amount of hydrogen sulfide remaining in the water removed from the bottom of stripper 2, to form sulfur, thereby reducing the hydrogen sulfide content of the water from the stripper 2 so that the effluent from the bottom of gas cooler-water treater 16 can be discharged through pipe 21 into an aeration pond 22 which can then be discharged into natural bodies of water or sewers. In the gas cooler-water treater 16 the water cools the gas stream to near the incoming water temperature.

The treated gas leaving the top of gas cooler-water treater 16 through pipe 4 is now quite free of any sulfur dioxide content and it consists almost entirely of nitrogen. The nitrogen in pipe 4 is transported into the lower portion of the stripper 2. The nitrogen gas is the stripping agent to remove the hydrogen sulfide from the water as previously explained.

The amount of gas recycled through pipe 15 is determined by the cost of the parts of equipment in the process. The more effective the stripper 2 the less the amount of gas to be recycled. A desirable amount is that which after stripping the hydrogen sulfide in stripper 2 will constitute one-half the volume of the resulting mixture.

Thus, it is apparent that the present invention provides an integrated process which is complete within itself. The process not only transforms some of the hydrogen sulfide into sulfur dioxide which, when reacted with the remaining hydrogen sulfide, is converted to elemental sulfur, but it also supplies heat and steam for the process and also provides at no extra cost as a by-product the source of inert gas, nitrogen, which is essential to the operation of the process.

In order more clearly to disclose the nature of the present invention, a specific example of the practice of the invention will hereinafter be given. It should be understood, however, that this is done solely by way of example and is intended neither to delineate the scope of the invention nor limit the ambit of the appended claims. Parts are expressed in terms of parts by weight unless otherwise stated.

EXAMPLE

This example illustrates the continuous, integral nature of the process. Water at its normal temperature containing 6000 p.p.m. of hydrogen sulfide is introduced into stripper 2 through pipe 1 and while cascading through the packing 3 is subjected to an upward countercurernt flow of inert gas comprising essentially nitrogen, without introducing additional heat, introduced into stripper 2 through pipe 4. The mixture of nitrogen and stripped hydrogen sulfide is removed through pipe 5 and transported to boiler-furnace 6. Also introduced is sufficient air through pipe 7 to burn about one-third of the hydrogen sulfide to sulfur dioxide. The resulting mixture of nitrogen, hydrogen sulfide, water vapor and sulfur dioxide is carried through pipe 8 into converter 9 equipped with a catalyst bed of bauxite. The gaseous reaction mixture is removed through pipe 10 into condenser 11. In the condenser, the elemental sulfur vapor is liquefied by cooling the gases to about 300–400° F. at which the sulfur vapor is converted to molten sulfur and removed from the condenser through pipe 12. The uncondensed gases are removed from the condenser 11 through pipe 13, where about two-thirds of the gaseous mixture is carried into the stack 14 and emitted into the atmosphere. The remaining one-third of the mixture of gases, containing a ratio of sulfur dioxide to nitrogen of about 1 to 60, is recycled through pipe 15 into the lower portion of gas cooler-water treater 16, where it is passed countercurrent through a spray of the treated water taken from the lower portion of stripper 2 through pipe 18 by pump 19 and pipe 20, where it is sprayed into the gas cooler-water treater 16 through spray 17. As it leaves the stripper 2, the water contains only about 100 p.p.m. of hydrogen sulfide. The water emitting from the bottom of gas cooler-water treater 16 is passed through pipe 21, to an aeration pond and thence to waste, at which stage it contains no uncombined hydrogen sulfide. The cooled gas, which is not absorbed by the water is carried through pipe 4 into the lower portion of stripper 2. It consists essentially of nitrogen.

As will be apparent to those skilled in this art, there are well-known variations which may be employed. Thus, for example, in one such variation, about two-thirds of the hydrogen sulfide passing through pipe 5 may bypass the boiler-furnace 6 and the totality of the remaining one-third of hydrogen sulfide reacted in the boiler-furnace 6 with an amount of air sufficient to supply oxygen stoichiometrically sufficient to oxidize all of it to sulfur dioxide. The bypass hydrogen sulfide is then introduced in pipe 8 to join the sulfur dioxide going to the converter 9.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for treating water containing hydrogen sulfide to remove and recover the sulfur values as elemental sulfur which comprises:
   (a) treating water containing hydrogen sulfide with an inert gas without the introduction of external heat to remove the major portion of the hydrogen sulfide and produce a water stream low in hydrogen sulfide content;
   (b) oxidizing a portion of the hydrogen sulfide removed in step (a) to sulfur dioxide and retracting the resulting sulfur dioxide with said remaining unoxidized hydrogen sulfide to produce elemental sulfur,
   the portion of hydrogen sulfide oxidized to sulfur dioxide being slightly in excess of that amount which furnishes sufficient sulfur dioxide to react substantially stoichiometrically with the remaining hydrogen sulfide to produce elemental sulfur;
   (c) collecting the elemental sulfur;
   (d) recycling at least a portion of the uncondensed gases remaining after step (c) and reacting the sulfur dioxide contained therein with the hydrogen sulfide contained in the water stream produced in step (a) to produce elemental sulfur; and
   (e) recycling at least a portion of the uncondensed gases remaining after step (d) to provide the inert gas for removing hydrogen sulfide from the water.

2. A process for treating water containing hydrogen sulfide to remove and recover the sulfur values as elemental sulfur which comprises:
   (a) treating water containing at least 500 p.p.m. of hydrogen sulfide with an inert gas which is substantially nitrogen without the introduction of external heat to remove the major portion of the hydrogen sulfide from the water to produce a water stream low in hydrogen sulfide content by countercurrent extraction;
   (b) oxidizing a portion of the hydrogen sulfide removed in step (a) to form an amount of sulfur dioxide slightly in excess of that amount required to react substantially stoichiometrically with the remaining hydrogen sulfide, said oxidation being carried out in an amount of air only sufficient to combust the hydrogen sulfide and remove all of the oxygen, thereby forming the nitrogen which comprises said inert gas, and reacting the resulting sulfur dioxide with the remaining unoxidized hydrogen sulfide to produce elemental sulfur;
   (c) collecting the elemental sulfur;
   (d) recycling at least a portion of the unreacted, uncondensed gases remaining after step (c) and reacting the sulfur dioxide contained therein with the hydrogen sulfide contained in the water stream produced in step (a) to produce elemental sulfur; and
   (e) recycling the uncondensed gases remaining after step (d) to provide the inert nitrogen gas for removing hydrogen sulfide from the water.

3. A process for treating water containing hydrogen sulfide to remove and recover the sulfur values as elemental sulfur which comprises treating hydrogen sulfide-pregnant water without the introduction of external heat with an inert gas by countercurrent extraction to remove the major portion of the hydrogen sulfide from the water, oxidizing a portion of the removed hydrogen sulfide to sulfur dioxide, reacting the resulting sulfur dioxide with the remaining unoxidized hydrogen sulfide to produce elemental sulfur, collecting the elemental sulfur, and recycling at least a portion of the remaining uncondensed gases to provide the inert gas for removing hydrogen sulfide from the water.

4. A process, according to claim 3, whereby the portion of hydrogen sulfides is oxidized by burning it in air, said air being furnished only in such amount that substantially all of the oxygen will be removed by the oxidation of the hydrogen sulfide and thereby provide the inert gas for removing hydrogen sulfide from the water.

5. A process, according to claim 3, wherein the inert gas is substantially nitrogen.

6. A process, according to claim 1, whereby the portion of hydrogen sulfide is oxidized by burning it in air, said air being furnished only in such amount that substantially all of the oxygen will be removed by the oxidation of the hydrogen sulfide and thereby provide the inert gas for removing hydrogen sulfide from the water.

7. A process, according to claim 1, whereby the portion of hydrogen sulfide oxidized to sulfur dioxide is slightly in excess of that amount which furnishes sufficient sulfur dioxide to react substantially stoichiometrically with the remaining hydrogen sulfide to produce elemental sulfur.

8. A process, according to claim 1, whereby the amount of hydrogen sulfide oxidized to sulfur dioxide is slightly in excess of about one-third of the hydrogen sulfide removed from the water.

9. A process, according to claim 1, wherein the water treated contains at least about 500 p.p.m. of hydrogen sulfide.

10. A process, according to claim 1, wherein the water treated contains at least about 6,000 p.p.m. of hydrogen sulfied.

11. A process, according to claim 1, wherein the inert gas is substantially nitrogen.

References Cited

UNITED STATES PATENTS

| | | | |
|---|---|---|---|
| 1,851,987 | 4/1932 | Schwab et al. | 23—224 |
| 1,924,861 | 8/1933 | Judson | 23—224 X |
| 2,355,147 | 8/1944 | Chazanow | 23—225 X |
| 2,773,003 | 12/1956 | Brown et al. | 23—181 X |
| 2,784,055 | 3/1957 | Silver | 23—181 |
| 3,079,238 | 2/1963 | Handwerk | 23—225 X |
| 3,331,733 | 7/1967 | Venemark | 2—181 X |

OSCAR R. VERTIZ, Primary Examiner

G. O. PETERS, Assistant Examiner

PO-1050
(5/69)

UNITED STATES PATENT OFFICE
CERTIFICATE OF CORRECTION

Patent No. 3,531,251           Dated Sept. 29, 1970

Inventor(s)  V.H. Brogdon

It is certified that error appears in the above-identified patent and that said Letters Patent are hereby corrected as shown below:

Claim 1, Column 5, line 71, "retracting" should be --reacting--.

Claim 4, Column 6, line 59, "sulfides" should be --sulfide--.

Claim 10, Column 7, line 11, "sulfied" should be --sulfide--.

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents